(12) United States Patent
Bennett et al.

(10) Patent No.: US 10,726,103 B2
(45) Date of Patent: Jul. 28, 2020

(54) PREMISES COMPOSITION AND MODULAR RIGHTS MANAGEMENT

(71) Applicants: James Duane Bennett, Hroznetin (CZ); Bindu Rama Rao, Laguna Niguel, CA (US)

(72) Inventors: James Duane Bennett, Hroznetin (CZ); Bindu Rama Rao, Laguna Niguel, CA (US)

(73) Assignees: James Duane Bennett, Hroznetin (CZ); Bindu Rama Rao, Laguna Nigel, CA (US)

( * ) Notice: Subject to any disclaimer, the term of this patent is extended or adjusted under 35 U.S.C. 154(b) by 221 days.

(21) Appl. No.: 15/622,516

(22) Filed: Jun. 14, 2017

(65) Prior Publication Data

US 2017/0364667 A1 Dec. 21, 2017

Related U.S. Application Data

(60) Provisional application No. 62/350,187, filed on Jun. 15, 2016.

(51) Int. Cl.
*G06F 21/10* (2013.01)
*G06N 20/00* (2019.01)
(Continued)

(52) U.S. Cl.
CPC ........... *G06F 21/10* (2013.01); *A01D 34/008* (2013.01); *A01D 34/64* (2013.01); *A01D 43/16* (2013.01); *A47L 7/00* (2013.01); *A47L 9/2805* (2013.01); *A47L 9/2852* (2013.01); *A47L 9/2857* (2013.01); *A47L 9/2894* (2013.01); *E04H 4/06* (2013.01); *E04H 4/1654* (2013.01); *G05D 1/0088* (2013.01);
*G05D 1/0291* (2013.01); *G06F 21/602* (2013.01); *G06N 20/00* (2019.01); *G06Q 30/016* (2013.01); *G06Q 30/0601* (2013.01); *G08B 17/10* (2013.01); *G08B 21/08* (2013.01); *H04L 63/0428* (2013.01);
(Continued)

(58) Field of Classification Search
CPC ...................................................... G06F 21/10
See application file for complete search history.

(56) References Cited

U.S. PATENT DOCUMENTS

2004/0195310 A1* 10/2004 Silverbrook ............ G06F 3/014
235/375
2016/0291595 A1* 10/2016 Halloran ................ B25J 9/1666

* cited by examiner

*Primary Examiner* — Simon P Kanaan
(74) *Attorney, Agent, or Firm* — Garlick & Markison; Bruce E. Garlick

(57) ABSTRACT

A multi-tired, modular, electronic system which utilizes restricted usage management. In a multi-tiered environment, lower tiered systems contain, based on configuration, mobile units that are capable of performing simple tasks such as lawnmowers, vacuum cleaners, mobile audio/video players to more complex ones capable of performing as human assistants such as robots. Higher tiered systems typically reside in the cloud. Lower tiered mobile units contain modular sensors such as temperature sensor and image/video cameras that generate vast amount of data. The lower tiered mobile units also contain modular emitters that consume vast amount of data. Restrictions for the usage of these mobile units are sent, in the form of metadata, to the lower tiered mobile units, from an intermediate to higher tiered control devices and the rendering app may limit the usage. The intermediate tiered renderer can interact to make sure rules have been followed.

20 Claims, 9 Drawing Sheets

(51) Int. Cl.
*H04L 29/06* (2006.01)
*G06F 21/60* (2013.01)
*A01D 34/00* (2006.01)
*A01D 34/64* (2006.01)
*A01D 43/16* (2006.01)
*A47L 7/00* (2006.01)
*A47L 9/28* (2006.01)
*G05D 1/00* (2006.01)
*G05D 1/02* (2020.01)
*H04L 29/08* (2006.01)
*E04H 4/06* (2006.01)
*E04H 4/16* (2006.01)
*G08B 21/08* (2006.01)
*H04N 21/414* (2011.01)
*G06Q 30/00* (2012.01)
*G06Q 30/06* (2012.01)
*G08B 17/10* (2006.01)
*A01D 43/00* (2006.01)
*G06N 5/04* (2006.01)
*A01D 101/00* (2006.01)
*G06Q 10/00* (2012.01)

(52) U.S. Cl.
CPC ............ *H04L 63/20* (2013.01); *H04L 67/104* (2013.01); *H04L 67/12* (2013.01); *H04N 21/414* (2013.01); *A01D 43/00* (2013.01); *A01D 2101/00* (2013.01); *A47L 2201/00* (2013.01); *A47L 2201/022* (2013.01); *A47L 2201/04* (2013.01); *G06F 2221/0746* (2013.01); *G06N 5/04* (2013.01); *G06Q 10/20* (2013.01)

PREMISES COMPOSITION AND MODULAR RIGHTS MANAGEMENT

CROSS REFERENCES TO RELATED APPLICATIONS

The present U.S. Utility Patent Application claims priority pursuant to 35 U.S.C. § 119(e) to U.S. Provisional Application No. 62/350,187, entitled "Modular Mobile Units," filed Jun. 15, 2016, which is hereby incorporated herein by reference in its entirety and made part of the present U.S. Utility Patent Application for all purposes.

BACKGROUND

1. Technical Field

The present invention relates generally to digital rights management, and, more specifically, premises composition and modular rights management of user devices.

2. Related Art

Today, digital rights management is commonplace, they protect unauthorized usage of copyrighted materials. They protect the rights of the authors, publishers, program developers and patent holders.

Commonly used digital rights management techniques impose certain restrictions as to how copyrighted materials are used at the user's end and in the user devices. In addition, they also encrypt the copyrighted material to minimize chances of theft of digital property.

In general, the digital content rights holders, using digital rights management techniques, are able to determine what restrictions they wish to impose at the user's end. Typically, digital rights management techniques require connection to the server and is typically enforced only in personal computers, smartphones or general purpose computing platforms.

In addition, they operate on two levels, a first level in which one digital source supplies digital content with rights (such as copyrighted materials) and a second level in which the user's device unlocks the digital content and utilizes the materials. Moreover, the second level is generally a single integrated unit and is typically immobile.

Further limitations and disadvantages of conventional and traditional approaches will become apparent to one of ordinary skill in the art through comparison of such systems with the present invention.

BRIEF SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

DETAILED DESCRIPTION OF THE DRAWINGS

Figure 1:
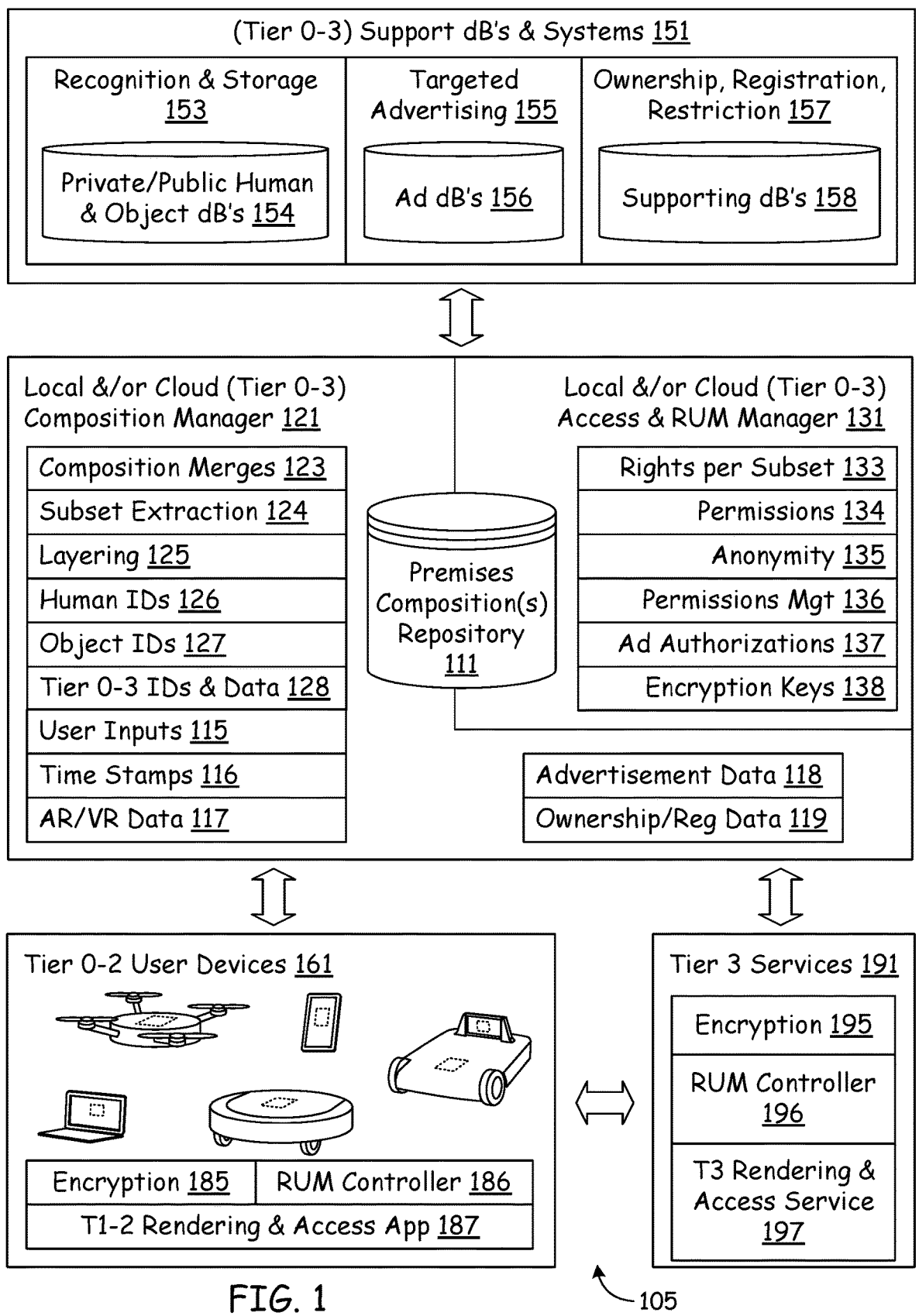
FIG. 1 is a block diagram illustrating a tier based restricted usage management (RUM) system, in accordance with the present invention.

FIG. 1 is a block diagram illustrating a tier based restricted usage management (RUM) system 105, in accordance with the present invention. In a multi-tiered environment, tier 0-2 systems contain, based on configuration, mobile units (tier 0-2 user devices 161, hereon) capable of performing simple tasks such as lawnmowers, vacuum cleaners, mobile audio/video players to more complex ones capable of performing as human assistants such as robots (bots, hereon). The simple systems mentioned above have rendering apps, installed by a user, and a few provided by default by the manufacturer.

Mobile units built as a lawnmower, a drone, a vacuum cleaner, a media playing device, etc. are used by a user to conduct their primary tasks (such as mowing lawn by the lawn mower) while these mobile units also collect data using their sensors, and share the collected data with devices and applications at the same tier or at upper tiers. Similarly, manager applications and service specific applications from higher tiers (configured as a cloud service, for example) send commands and configurations to mobile units at lower tiers.

Mobile units at Tier 0 have limited capability and conduct their primary activities, additionally collecting data from sensors and encrypting them before sending them to other devices or managing services, etc. Tier 1 devices are more capable than Tier 0 devices, and are expected to have apps (pre-installed or user installed based on a configuration) for specific services. Tier 2 mobile units have controllers and managers for various services, in addition to apps. They conduct aggregation of data from multiple mobile units, and they manage a composite set of data for sharing and storage. Tier 3 capabilities are typically provided as cloud based management and control functionality. Other forms of configuring various tiers based on capabilities and control of functionality, and based on data aggregation responsibilities, are also contemplated.

For example, an encrypted file is sent from the tier 2 renderer, and so long as a rendering app is available on the tier 0-2 user device 161, the user is able to play them. Additional permissions may be sent to the tier 0-2 user device 161, from the tier 2 control device and the rendering app may restrict the usage of the encrypted file. For example, the user can use it or read it once, render it for a week, and make no distribution, or copies at all, or selectively decide to make just one copy. These sets of permissions are sent in the form of meta data. The tier 2 renderer can interact to make sure rules have been followed. The tier 0-2 user devices 161 may have a thin operating system (OS) sufficient to conduct its primary tasks and collect (using sensors onboard) data for sharing.

The tier 0-2 user device 161, in one embodiment, may comprise of one or more sensors, built-in, pluggable and/or interchangeable. With such a configuration, the tier 0-2 user device 161 can carry out a vast number of tasks to assist a user. For example, after vacuuming, the tier 0-2 user device 161 might roam on a home security route while examining interior and exterior building conditions and landscaping health. After determining that a section of property is in need of user attention, the tier 0-2 user device 161 alerts the user of the condition, offers up suggestions for interior or exterior repair or renovation, and includes advertising offers that take the form of augmented reality (AR) visualizations.

The tier 0-2 user device 161 is assembled and/or configured and reconfigured to carry a multitude of several different sensors based on its purported usage and based on services it is designed to provide. The tier 0-2 user device 161 is fitted with emitters of different kinds, some of them incorporated by default based on the tasks to be performed by it and the environment it is to be employed in, while other emitters are plugged in or added by the user for specific tasks.

In such a scheme, a simple or more complex tier 0-2 user device 161 generates a large amount of data by tier 0 sensor/emitter/mechanical elements (with common API). These tier 0-2 user devices 161 comprise of single tier restricted usage management (RUM, hereon). For example, they can be put in a bot or docked under the bot unit.

For example, consider a tier 0-2 user device 161, such as a lawnmower or bot. Data is generated all the time by sensors onboard, by these tier 0-2 user devices 161 (by the T0 elements). The camera data (monitoring the house for security, for example) or sensor data (sensing grass height, for example) generated is locked away by the tier 0-2 user device 161 owners. A user may wish to keep data private and let no one see those images, for instance. This locking of the generated data is done at T0 level, or maybe at tier 1 (T1, hereon), tier 2 (T2, hereon) or tier 3 (T3, hereon) levels.

The control for locking such a data may be acquired by the T0, via T1, via T2 or via T3 or from T3 directly. This is achieved by putting the function of RUM in the nodes T0 to T3. A composition manager 121 gets the raw data (the composition manager is in charge of keys, encrypting and licensing), and the output that comes out is something that gets restricted usage managed by RUM manager 131. The composition manager 121 has two primary duties in one configuration, one is to encrypt and another is to permit access. The RUM is to be established along the way, from nodes T0 to T3. Hence, every single node (T0, T1, T2 and T3) has to have two elements: a) ability to place the data into a form that can be restricted usage managed. b) every node from T0 to T3 has the ability to put in RUM element in it.

In accordance with the present invention, there is a unique structure in the abovementioned multi-tiered architecture. In one of the nodes (from T0 to T3), they come together as a composition. This composition contains raw data from the sensors, which are then compressed, encrypted and so forth. For example, an emitter (manufactured by a particular company) may require a sensor data (manufactured by an entirely different company) at node T0, which may require RUM to occur in the middle. (It all depends on the purpose of how the multi-tiered architecture of the current invention is used by the programmer.) Every single node (T0 to T3) can receive data that are only meant for them, for example T3 may receive restricted usage managed data only meant for it, without being known by the nodes T1 and T2 (even though they may pass through the nodes T1 and T2).

In addition, there is a permission control along the way. The permission management typically is a node T3 functionality, but also exist in T0, T1 or T2 nodes based on configuration in particular mobile units. Permission management is typically implemented by keys and data, extractions and filters. It can be preprogrammed (and can also be set by the user, by using an app). For example, two lawnmowers can share data. RUM is also concerned about managing the permissions. For example, a user may write an app for these two mowers: "if temperature is above certain level, use mower A, otherwise use mover B."

There is a plurality of possibilities for both manufacturers and programmers, with the multi-tiered dynamic and flexible environment of the current invention, to come up with ideas as to what they intend to develop and sell. For example, a manufacturer may manufacture a T0 element, a bot may be a T1 user device 161, while it also contains several T0 elements (such as sensors). For example, a mobile unit may be a T1 unit, but there may be one T0 element built-in, while two more T0 elements plugged in into pluggable slots. The T1 user device 161 may not have permission to use the plugged in T0 elements, but only an application or a management service located in the cloud as a T3 service is able to manage and access the plugged in T0 elements.

Every single node in this tiered environment is involved in the RUM and has to be able to manage the incoming data. That is, there is an incoming composition data RUM and there is an outgoing composition data RUM at every node (T0, T1, T2 and T3). The incoming composition data RUM handles the incoming signal at every node and the outgoing composition data RUM handles the outgoing signal at those nodes. They can also handle signals directed from or to other nodes from other tier 0-2 user devices 161.

Further, they can also handle raw data (for example, coming directly from a sensor) as well as encrypted signals coming from other nodes. If a lower tier element provides data in raw format instead of encrypting them for security, the receiving element encrypts it and makes up for the deficiency (if any) in the lower elements. They can let the incoming data pass through the current node untouched, or they can encrypt them and process for further usage, or they can encrypt then and let them pass through to other nodes of the same tier 0-2 user devices 161 or towards any of the nodes of other tier 0-2 user devices 161 in the vicinity or faraway (via Internet, for example). In case, a node (T0, for example) does not have enough ability process the signal coming from another node (another T0, for example), it can get it processed at a higher level node (such as nodes at T1, T2 or T3). The data may or may not need compartmentalization. In accordance with the present invention, the tier based restricted usage management system 105 is not just tiered hierarchy but also incorporates tiered RUM. Similarly, the renderers also become tiered renderers.

In addition, as soon as the data is generated (at tiers T0, T1 or T2), they are encrypted (and compressed, if necessary). At every higher level node, the data may be decrypted (and decompressed), if they are the legitimate recipient nodes.

For example, a lawnmower may have primary function defined as lawn mowing. This particular function may not generate much data. But, it may also have a secondary function as a security guard for the house and family members (since it always stays in the lawns around the house). This secondary function may generate enormous data such as still and moving images, and videos. This data generation, by the secondary function, typically occurs at T0 level in one configuration. As soon as the data is generated by the lawnmower, it encrypts and compresses the data for moving toward higher level nodes. (It is so designed to secure the images and videos from unwanted recipients.) The legitimate recipient node may be at level T2 (which is nothing but smartphones of the owners), whereas the T1 level is a docking charging system. Here, the node T1 merely passes the data without altering it, toward the smartphones at level T2. In the smartphones, these data are processed by decrypting and decompressing and letting the owners to discard them and keep them. However, the data may still be passed on further to T3 level (in the cloud), where they might be stored securely forever (at least some selected portions of the images or videos).

The tier based restricted usage management system 105, in accordance with the present invention, also incorporates rights and permissions at every node T0, T1, T2 and T3. Unless a node has the permission to unlock the data, the node can only pass it on (unless, it does not have permission even to pass it on to another node). This includes T0 node, a bot for example, cannot even capture an image unless it has permission to do so. Consider another example. One bot may need data (an image, for instance) from another bot to make a decision. To access another bot's data, there has to be an interaction with the permissions management, and requires user authorization. The permission management may exist anywhere (and both in online and offline modes), but most likely to be at a higher level node, including T3 node in the cloud.

Each tier 0-2 user devices 161 itself, in accordance with the present invention, is capable of providing a service or executing a household chore, and the service or household chore is specific to the design. For example, the household chore can be vacuuming, cleaning, monitoring activities, collecting data, turning appliances on or off, turning lights on or off, monitoring temperature, etc. They can belong to T0, T1 or T2 levels, or combination thereof.

In one embodiment, the tier 0-2 user device 161 is capable of generating huge amount of data, from one or more of its modules (pluggable and interchangeable) such as sonar, 2D and 3D cameras tuned for visible, ultraviolet and infrared frequencies, music recording and playback circuitry, spectrum analyzers, video player circuitry, wireless hub/extender (or wireless bridging circuitry), voice recognition and synthesis and artificial intelligence (AI) software and circuitry and/or linkages and interfaces to same on cloud or handheld or server computing systems, smoke and radon detection circuitry and elements, and home appliance controller and/or communication interface circuitry. The tier 0-2 user device 161 also contains sensors (generating huge amount of data) such as proximity, range, tilt, motion, accelerometer, compass, gyroscope, GPS, rain, snow, temperature, ice, mud, ultrasonic, acoustic wave, infrared (IR), ultraviolet, multi-microphone, altimeter, barometer, smoke, radon, radiation, $CO_2$, carbon monoxide, pollen counter, video/imager—plus face recognition/detection, human body, pet, objects, lumen/ambient light, spectrum analyzer, pump/fan particulate counter, dissolved solids detection (e.g., calcium, magnesium, potassium, sodium, bicarbonates, chlorides, sulfates), PH, alkalinity, 3D depth sensing and dimensioning and so forth.

The data generated from the tier 0-2 user devices are subjected to the RUM (encryption, compression, permission and rights) and has the following units to perform its duties: encryption module 185, RUM controller module 186 and T1-2 rendering and access apps 187.

The tier based restricted usage management system 105 comprises of (Tier 0-3) Support dB's & Systems 151, that may include artificial intelligence. The (Tier 0-3) Support dB's & Systems 151 consists of recognition and storage module 153, targeted advertising module 155 and owner, registration, restriction module 157. Each one of these modules 153, 155 and 157 contain their own internal databases, to perform their respective functions, including private/public human and object databases 154, advertisement databases 156 and supporting databases 158 respectively.

The recognition and storage module 153 recognizes human faces and body shapes, voice characteristics and their body odor within a captured image, live image or video, audio and odor samples, and stores them in the private/public human and object databases 154. It also recognizes objects in its environment, such as table, books, pens and telephones, and stores them in the private/public human and object databases 154. These samples are utilized later on to generate interactions with the tier 0-2 user device 161 owners as well as strangers. When, for example, owners of the tier 0-2 user device 161 say "Oh, that is a football," the tier 0-2 user device 161 reacts by saying "Alright, I got it," and these interactions along with the moving image of football are then sent to the recognition and storage module 153 for recognition, storage and for future recognition.

Targeted advertising module 155 generates and delivers targeted advertisements directed toward owners (or family members) of the tier 0-2 user device 161. These targeted advertisements are stored (to be generated conditionally, based on contexts) in advertisement database 156. For example, a vacuum cleaner may generate and deliver advertisements upon determining the faded color of the carpet, for a replacement (along with the names of the stores where they are sold or replaced and price quotes).

Ownership, registration and restrictions module 157, along with its corresponding supporting databases 158, stores the ownership details (who you are as an owner), geographical locations and restrictions. The restrictions stored in the supporting databases 158 includes boundaries (such as the limits beyond which the tier 0-2 user device 161 cannot move or take images or videos, or stop executing the functionality when the owner or family members or other human beings are closer than one meter) and other limitations that the tier 0-2 user device 161 cannot cross. In general, the tier 0-2 user device 161 needs to be authorized to perform each and every functionality and times of operation (i.e. times at which the tasks can be performed), by the owner. These functions of the modules 153, 155 and 157 can be programmed and stored in any of the nodes, although typically they might reside in T2 or T3 nodes.

The local and/or cloud (tier 0-3) composition manager 121 (discussed before) may exist in any of the nodes T0, T1, T2 and/or T3. The composition manager 121 typically handles the encryption related processes. The composition manager 121 comprises of composition merges 123, subset extraction 124, layering 125, human identities 126, object identities 127, tier 0-3 identities and data 128, user inputs 115, time stamps 116, AR/VR (augmented reality/virtual reality) 117, advertisements data 118 and ownership/registration data 119. Similarly, local and/or cloud (tier 0-3) access and RUM manager 131 may exist anywhere within the nodes T0 to T3. The access and RUM manager 131 is typically responsible for determining which nodes T0 to T3 uses the RUM data. The access and RUM manager 131 comprises of rights per subset 133, permissions 134, anonymity 135, permission management 136, advertisement authorizations 137 and encryption keys 138.

The subset extraction module 124 extracts data from different sources (each possibly with their own encryption keys and encryption methods), whereas composition merges 123 merges them into a single RUM stream. Different sources of raw data, for example from different sensors, likely to produce their own encryption, having been manufactured by various unrelated manufacturers. Layering module 125 in fact refers to layered architecture like a human brain. For example, tables and furniture in a room may be considered as one layer, whereas tables and furniture with books and other items on the tables and furniture as another layer. Moving objects and people may be considered by the layering module 125 as yet another layer, and so forth. The human IDs 126, object IDs 127 and tier 0-3 IDs and data, store and process their corresponding representations in premises composition(s) repository databases 111. For example, the human IDs 126 may store and process facial characteristics of the owner and family members along with their names. Similarly, table, chair and so forth may have their representations along with names stored in the object IDs 127. The layer module 125 does layering in conjunction with these databases 111, layering being a functional process.

The user inputs module 115, for example, may store and process human responses such as "I like pizza," "I don't like spinach." The time stamps module 116 keeps track of time (records of day, date and time) in conjunction with events that took place. AR/VR data 117 stores and processes augmented reality and virtual reality related data. For example, using AR, the owner of a bot device may be able to see what would happen if the room is painted with green color along with yet to purchase furniture. Similarly, advertisement data 118 contains context based advertisements. For example, if the owner likes what he or she sees when the room is decorated with green color, the bot may suggest a particular painter (whose advertisement may appear on the screen). Similarly, ownership and registration data 119 contains personal data related to the owner. Finally, all these data records become part of the composition.

It should be clear that the mobile unit modelled after the tier 0-2 user devices 161 takes many forms, such as a CAR, a truck, a semi-robotic or robotic vehicle. For example, the tier 0-2 user devices 161 is anything that is robotic, mobile and capable of data collection and sharing in accordance with the present invention.

Figure 2:
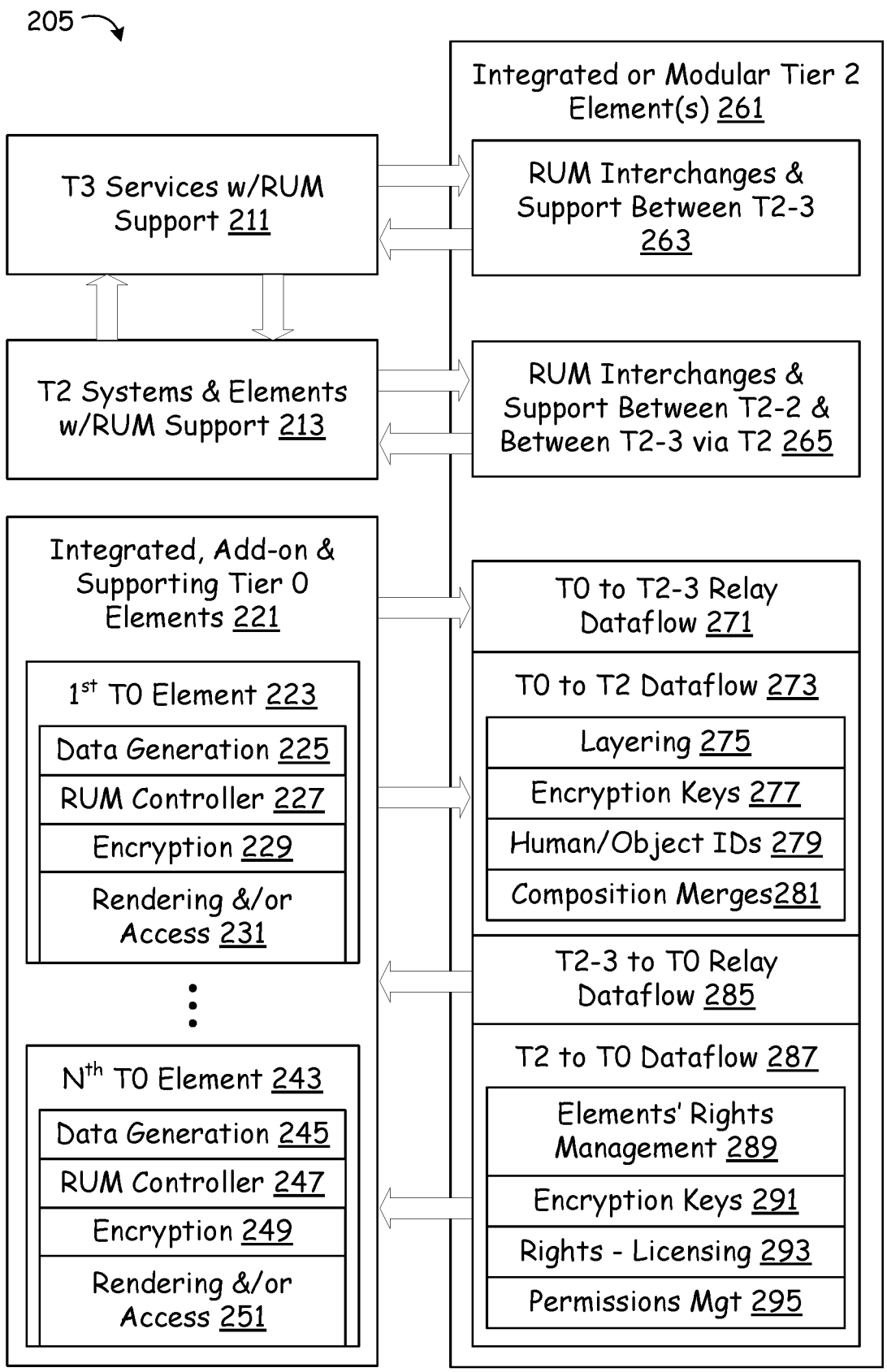
FIG. 2 is a block diagram illustrating the data flow within the tier based restricted usage management system of FIG. 1.

FIG. 2 is a block diagram illustrating the data flow 205 within the tier based restricted usage management system of FIG. 1. The data flow begins with T0 elements, $1^{st}$ T0 element 223 to $N^{th}$ T0 element 243. In specific, there are from one to multitude of T0 elements in a typical tier based restricted usage management system. Upon request from higher level nodes, the T0 elements $1^{st}$ T0 element 223 to $N^{th}$ T0 element 243 generate data. However, the T0 elements $1^{st}$ T0 element 223 to $N^{th}$ T0 element 243 send these generated data to higher level nodes in encrypted form, compressed form or merely raw data form, depending on the configuration.

The T0 elements $1^{st}$ T0 element 223 to $N^{th}$ T0 element 243 are part of an integrated, add-on and supporting tier 0 elements 221. In other words, the T0 elements $1^{st}$ T0 element 223 to $N^{th}$ T0 element 243 are integrated into a single electronic circuitry. Alternatively, at least some of the T0 elements $1^{st}$ T0 element 223 to $N^{th}$ T0 element 243 are independent pluggable units. They typically contain sensors, such as temperature sensors, that generate data via data generation module 225 and 245.

To perform their functions of generating data and encrypting them, the T0 elements $1^{st}$ T0 element 223 to $N^{th}$ T0 element 243 consist of data generation modules 225, 245, RUM controllers 227, 247, encryption modules 229, 249 and rendering and/or access modules 231, 251. The data generation modules 225, 245, for example, may be temperature sensors, barometers or any other sensors. They generate sensed data upon request by the higher level nodes (T1, T2 or T3 nodes), the request from these higher level nodes come from renderer applications, and sent by the rendering and/or access modules 231, 251. If encrypted data is requested by the renderer applications, then the encryption modules 229, 249 encrypt them before sending.

The (control) data coming from node T2-3 to T0 relay dataflow 285 simply pass through intermediate nodes without altering the contents, unless an intermediate node, in specific, requests for the data (or the node has the permission to consume the data). T2 to T0 dataflow 287 consists of element's rights management 289, encryption keys 291, rights-licensing 293 and permission management 295. The permission management 295 manages the T0 elements $1^{st}$ T0 element 223 to $N^{th}$ T0 element 243 permissions. For example, a camera unit (the T0 element) taking video of people outside the fence is not allowed. The camera unit itself is mounted on a lawnmower that acts as a security guard, in its secondary function. The element's rights management 289 manages the rights of the renderer (any higher level nodes), such as using the data only once.

T0 to T2-3 relay dataflow 271 allows data to flow unaltered toward a higher level node (tier T3, for example), which requested for the sensor data. T0 to T2 data flow 273 consists of layering module 275, encryption keys 277, human/object IDs 279 and composition merges 281. The composition merges 281 merges the T0 elements $1^{st}$ T0 element 223 to $N^{th}$ T0 element 243 data into a single composition (RUM) stream. The layering module 275 classifies the T0 elements $1^{st}$ T0 element 223 to $N^{th}$ T0 element 243 data into different layers. For example, in one configuration, carpets are considered as the stationary first layer, sofa set and chairs as the stationary second layer and the moving objects such as human beings and pets as third layer. The human/object IDs 279 associates these different layered humans and objects with different IDs, so as to be able to identify them later on.

RUM interchanges & support between T2-2 & between T2-3 via T2 265 manage and support multitudes of T2 systems & elements w/RUM support 213, so that the data exchange occurs between T2 elements and between T2 elements and higher and lower tiered nodes. Similarly, RUM interchanges & support between T2-3 263 and T3 services w/RUM support 211 interact to manage and control higher level nodes (T2-T3 nodes) and smooth operations of the entire tier based restricted usage management system of FIG. 1

Somewhere along the way of dataflow toward higher level nodes (for example, from T0 node towards T3 nodes, via nodes T1 and T2), the composition of data occurs. Alternatively, in each level the composition is possible, to a certain extent. For example, an application run on a mobile phone may be a T2 node, and it needs certain data from the T0 node such as a barometer. The control signal (command) then passes through T1 node (which sends the command without altering it) to the barometer (T0 node), requesting for the data. This generated barometer (sensor) data then passes through T1 node to the mobile phone (T2 node), which using an algorithm displays the data for the user. Some processing of this data at T2 node occurs at cloud (T3 node). In one of the embodiments of the present invention, instead of T0 to T3 nodes, more number of nodes are also contemplated, with highest level node being the cloud.

Figure 3:
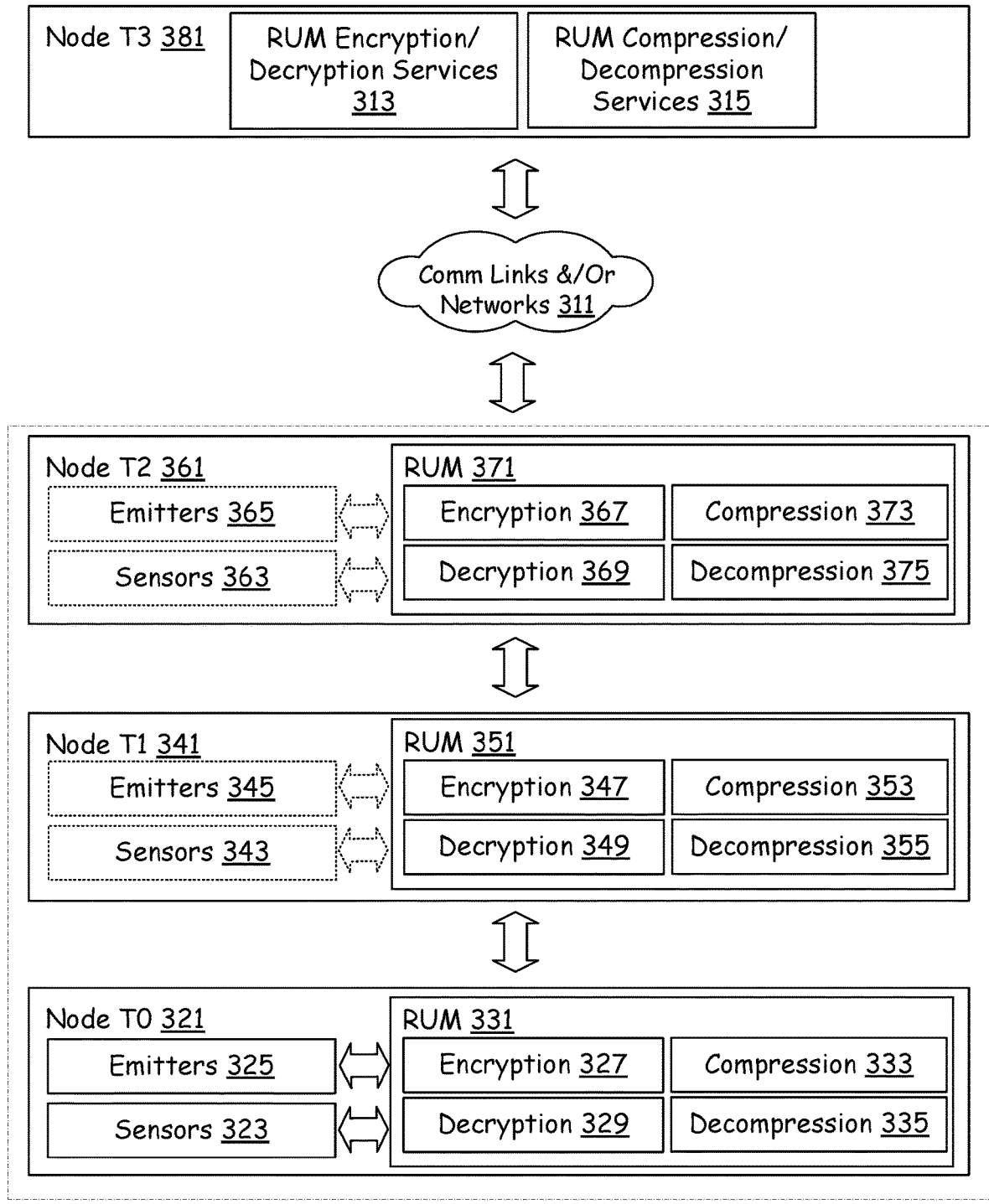
FIG. 3 is a block diagram illustrating the tier-wise distribution of encryption and compression processes within the tier based restricted usage management system of FIG. 1.

FIG. 3 is a block diagram illustrating the tier-wise distribution of encryption and compression processes 305 within the tier based restricted usage management system of FIG. 1. In accordance with the present invention, node T0 321 consists of one or more of sensors 323 and emitters 325.

For example, a lawnmower, to perform its secondary function as a security guard, may contain a video camera (which is a sensor) to record or to relay to higher level nodes, still or moving images or short video clips of the localities within the boundary. At the sight of any intruders, to warn them off the boundary, the lawnmower also contains speakers (which is an emitter). In this context, an infrared signal emitter may also exist, to identify the distance from the family members or intruders, among many other emitters.

In one embodiment of the present invention, at the node T0 321, some basic RUM 331 functionalities also exist. In another embodiment, at node T0 321, only emitters 325 and sensors 323 exist, generating only raw data meant to be consumed by the higher level nodes, such as a mobile phone or personal computer. These independent sensors and emitters are typically pluggable units. Alternatively, the independent and pluggable modular sensors also contain basic RUM 331 functionalities built into them. In the example mentioned above, the node T0 321 may be the lawnmower itself, with sockets meant to receive sensors.

Among the basic RUM 331 functionalities are encryption 327, decryption 329, compression 333 and decompression 335. When the node T0 321 sensor 323 data needs to be relayed directly to node T3 381 (the data nonetheless passes through node T1 341 and node T2 361) and the data volume is high (such as a video camera data), for example, the data is compressed 333 and encrypted 327. This is especially the case if the data contains private information such as faces of family members or details of the house interior, for security and privacy reasons.

Similarly, if the data volume is high, such as when transferring data from cloud (node T3 381) directly to speakers of the node 321, the data received from the node T3 381 is decompressed 335 and decrypted 329. The node T3 381 in the cloud has RUM encryption/decryption services 313 and RUM compression/decompression services 315 for such purposes. The communication between the node T0 321, node T1 341, node T2 361 and the cloud node T3 381 takes place via communication links &/or networks 311.

In one embodiment of the present invention, the higher level node T1 341 and node T2 361 contain their own emitters 345, 365 and sensors 343, 363 respectively. In other embodiments, they do not contain emitters and sensors. Further, the node T1 341, node T2 361 also contain much higher capabilities that include encryption 347, 367, decryption 349, 369, compression 353, 373 and decompression 355, 375.

In one configuration, encrypted data from the node T0 321 is passed on to a higher level node (node T1 341 or T2 361, for example), at which node the encrypted data is decrypted 349, 369 and processed. In another configuration, the node T0 321 sends raw data (being not equipped with basic RUM 331 functionalities, for example) to a higher level node (nodes T1 341 or T2 361, for example), where the raw data gets encrypted.

In some embodiments, the nodes T0 321, T1 341, T2 361 are all physically self-contained within a single unit. For example, a bot might be self-contained, with T0 321, T1 341 and T2 361 nodes entirely built into them, along with displays and user interfaces.

Figure 4:
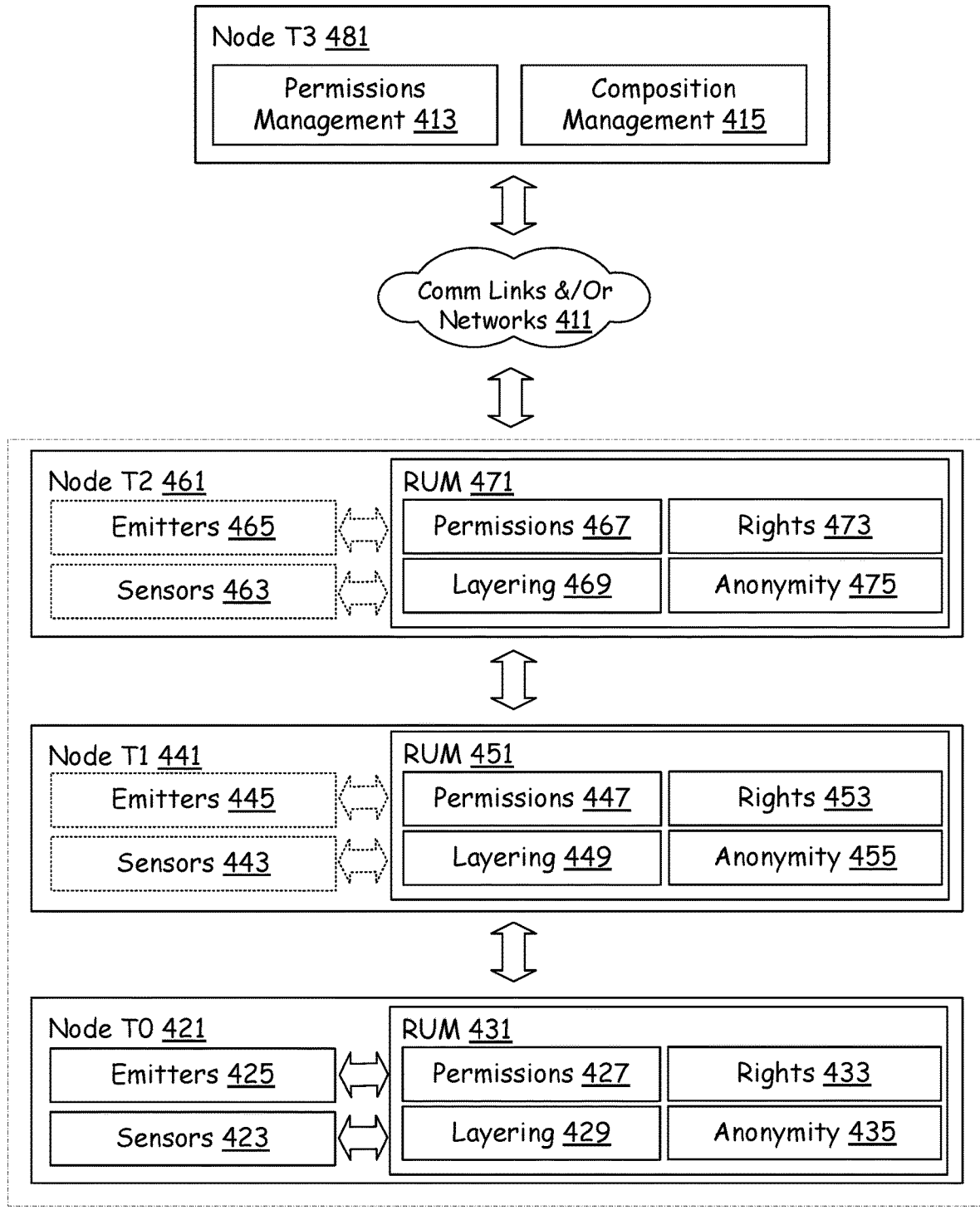
FIG. 4 is a block diagram illustrating the tier-wise distribution of permissions and rights management processes within the tier based restricted usage management system of FIG. 1.

FIG. 4 is a block diagram illustrating the tier-wise distribution of permissions and rights management processes 405 within the tier based restricted usage management system of FIG. 1. Node T0 421 consists of sensors 423 and emitters 425, in its elementary existence. These are either built into the node T0 421 systems in an integrated manner or as pluggable, removable modules.

The node T0 421 also consists of some basic RUM 431 functionalities, in addition to those mentioned with respect to FIG. 3. They are permissions management 427, rights management 433, layering functions 429 and anonymity 435. The permissions management 427 functionality restricts the usage of the user device (161 of FIG. 1) beyond the preset limits. These preset limits are defined by the manufacturer, and additionally configured by the user, for the purposes of safety and security of the family members and to respect the rights of the neighbors and other people who happened to be within the concerned area in which the user device (161 of FIG. 1) functions.

For example, a vacuum cleaner may be equipped with additional functions to work as a personal assistant of the owner. The vacuum cleaner, that works as the node T0 421 device, may contain variety of sensors 423, such as humidity sensor, accelerometer, gravity sensing, barometer, infrared body and surface temperature sensor and other health related sensors. It may also contain variety of emitters 425 such as speakers, infrared light emitters that function as television remote control and so forth. Using these sensors 423 and emitters 425, the vacuum cleaner is able to assist the owner, by keeping close to him or her (at a meter distance behind him or her, for example), and fulfilling the requests of the owner such as playing requested music, switching on/off household appliances and lights, changing channels of television, answering questions related to weather, sports or news by hooking up with an artificial intelligence engine in the Internet. When the owner is not present at home, the vacuum cleaner may engage in its primary function of vacuuming the house.

The permission management 427, in the current example context, may involve maintaining the distance with the owner and family members, not coming in the way of owner or family members when they are walking, talking respectfully with the owner and family members (assuming the vacuum cleaner is a learning machine) and so forth.

The higher level nodes, such as node T1 441 and node T2 461, also contain RUM functionalities, but with much higher capabilities. The functionalities include permissions management 447, 467, rights management 453, 473, layering 449, 469 and anonymity 455, 475. Considering the above-mentioned example of vacuum cleaner with secondary function as an assistant, a self-docking charger unit may function as node T1 441, whereas the owner's mobile phone or personal computer (with corresponding applications supplied by the manufacturer or a renderer, for example) may function as node T2 461.

The rights management 433, 453 and 473 involve managing the rights of the renderer or manufacturer, such as copyright restrictions. For example, a bot, which self-contains all three nodes T1 421, T2 441 and T3 461 within it, may have the capability of playing music. The renderer may impose restrictions such as play one time or two times, play for a week or month and so forth.

Layering 429, 449 and 469 functionalities, being distributed between the three nodes T1 421, T2 441 and T3 461, simply classify the home or building interior stationary objects and moving objects (such as people and pets) as well as stationary objects and moving objects external to the building or house such as lawns. Anonymity management 435, 455 and 475 functionality restricts user devices (161 of FIG. 1) usage, as configured by the owner. In addition, a node T3 481, existing in the cloud, consists of permissions management 413 and composition management 415. The communication links and/or networks 411 allow the communication between node T3 481 and the nodes T0 421, T1 441 and T2 461 to occur.

Figure 5:
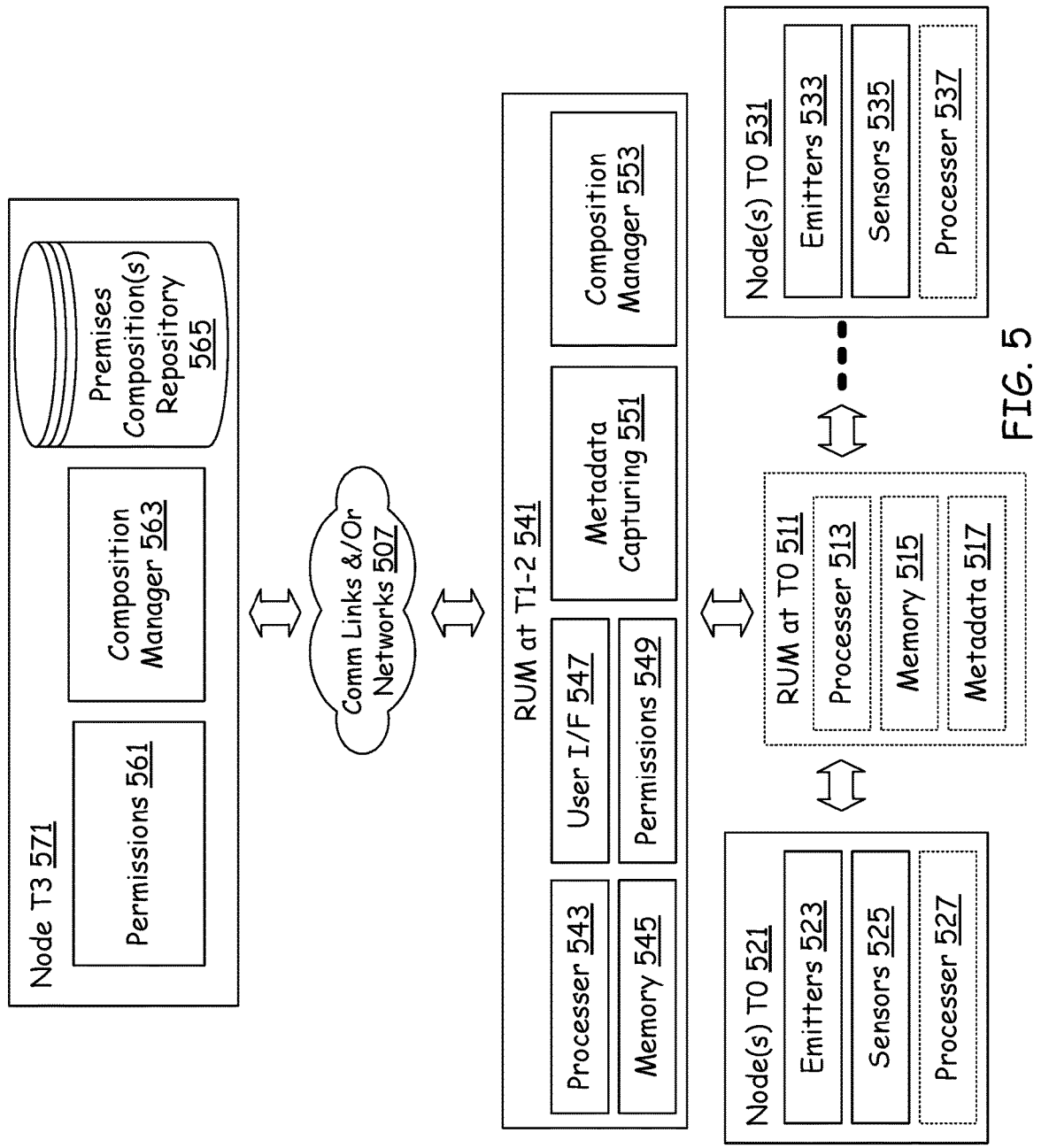
FIG. 5 is a block diagram illustrating tier zero node capabilities, in accordance with the tier based restricted usage management system of FIG. 1.

FIG. 5 is a block diagram illustrating tier zero node capabilities 505, in accordance with the tier based restricted usage management system of FIG. 1. In specific, there are one to many T0 elements 521, 531, either housed within a single user device or distributed among many of them. They are either pluggable and detachable (plug and play) modular units or integrated into a single circuitry.

If T0 elements 521, 531 are pluggable and detachable, each one of the housings contains sensors 525, 535 and emitters 523, 533 along with some processing capabilities 527, 537. In one embodiment, the T0 elements 521, 531 are merely modular sensors 525, 535 and emitters 523, 533 without any processing capabilities. Similar reasoning applies when the sensors 525, 535, emitters 523, 533 and processing capabilities 527, 537 are integrated into a single circuitry and housed within a single enclosure (lawnmowers or vacuum cleaners, for example).

In addition, regardless of whether the T0 elements 521, 531 are housed within a single enclosure or distributed, they possess RUM capabilities 511, by utilizing a processor 513 and memory 515. In one embodiment, the entire T0 elements 521, 531 are made up of modular sensors 525, 535 and emitters 523, 533 without any processing capabilities 527, 537 or RUM capabilities 511. In another embodiment, the RUM capabilities are distributed among different modular T0 elements 521, 531, along with a centralized RUM at T0 node 511. Moreover, the RUM at node T0 511 also generates metadata 517. The RUM at node T0 511 is also capable of composing the data, metadata into a single stream for aggregation.

In one configuration, the node T0 521 and node T0 531 communicate with each other and each of these node elements at T0 521, 531 also consume data from other T0 elements. For example, the sensor data 525 from a smoke detector embedded within a vacuum cleaner, along with processing capabilities of RUM at T0 511, may trigger a response from a speaker or mobile phone (emitter 533) elsewhere, in an emergency situation.

RUM at node T1-2 541 has full-fledged capabilities of RUM and utilizes data from T0 elements 521, 531 to develop composition for aggregation purposes. For that purpose, the RUM at node T1-2 541 consists of processor 543, memory 545 and user interfaces 547. The RUM at node T1-2 541 also contains permissions module 549, metadata capturing module 551 and composition manager 553. Similarly, the node T3 571, being in the cloud, has more advanced RUM processing capabilities and contains permissions module 561, composition manager 563 and premises composition(s) repository 565. The communication links and/or networks 507 makes the communication between node T3 571 and the nodes T1-2 541 and T0 521, 531 possible.

Furthermore, in one configuration, each and every T0 element 521, 531, while generating sensor 525, 535 data, also generate metadata 517. The metadata 517, for example, may include time stamping all the data captured, the contributing sensor 525, 535 information and signature of the data. They metadata 517 is stripped at higher level nodes (at T1-2 nodes 541 or at T3 node 571) and used if relevant, otherwise is discarded. For example, the global positioning system (GPS) coordinates also constitute metadata. This information along with time information may be stripped and used by the metadata capturing module 551. For example, in order to make sense of temperature measurements, in some circumstances, the nodes at T1-2 541 need metadata such as GPS, time, originator information.

Figure 6:
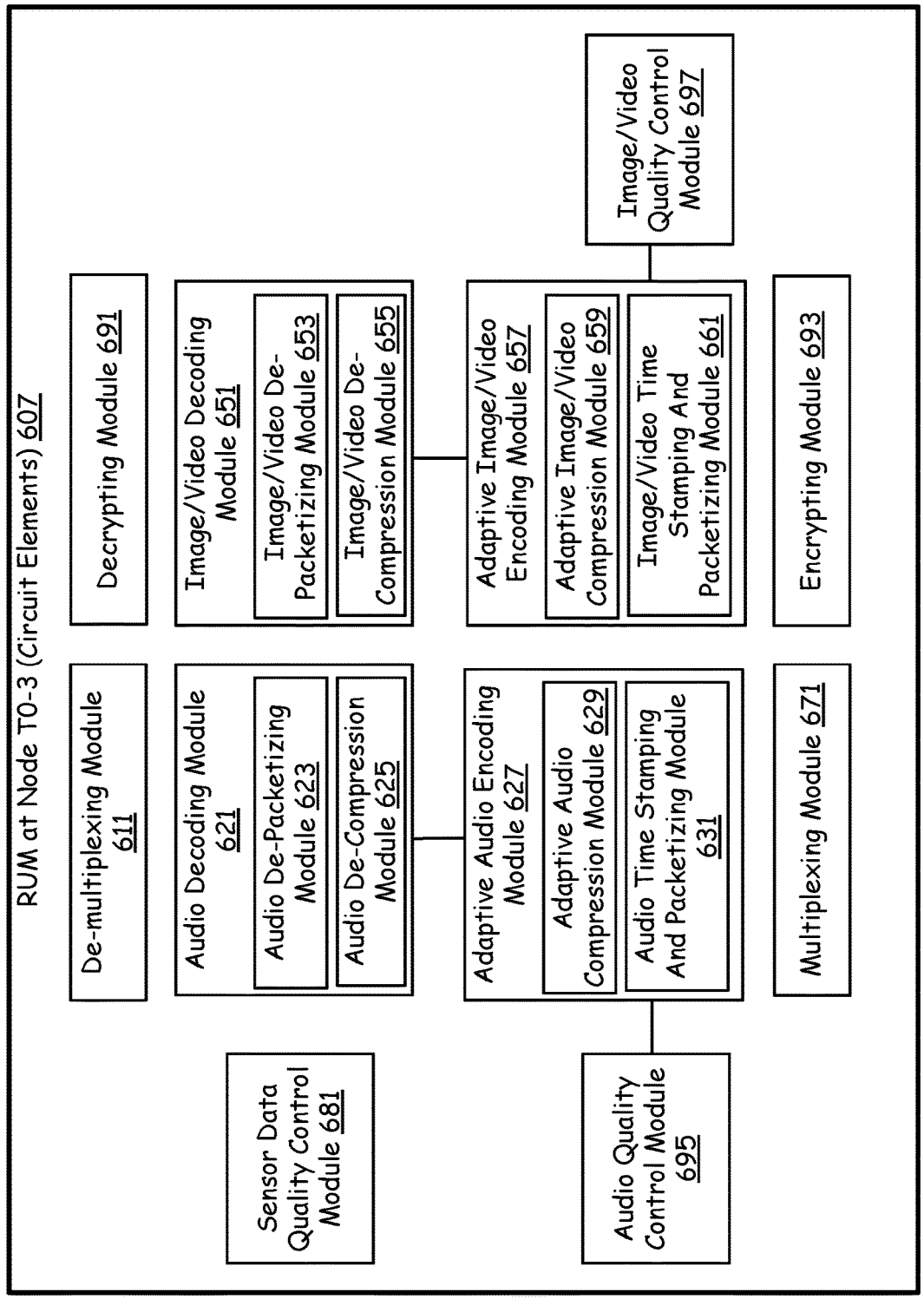
FIG. 6 is a block diagram illustrating transcoding capabilities of the tier based restricted usage management system of FIG. 1.

FIG. 6 is a block diagram illustrating transcoding capabilities 605 of the tier based restricted usage management system of FIG. 1. The transcoding capabilities of the node T0-3 (circuit elements) 607 is essentially used to reduce the quality of the audio, image or video recordings as well as sensor data. This reduction in quality enhances security and safety, privacy of the users. The quality is also reduced when delivering the audio, image or video recordings, sensor data to modules with less reproduction or usage capabilities. This feature of reducing the quality of audio, image or video recordings, sensor data is also an important feature of the restricted usage management.

For example, a multi-purpose bot may be employed to move around interior to a house and within the boundary external to the house, to enhance security as a primary duty and to assist managing the garden as a secondary duty. The bot, needless to mention, generates lots of data in the form of audio, video clippings, images and other sensor data. When displaying such data generated in a mobile phone with lesser capability, some of the quality needs to be changed, format may have to be changed and excessive unwanted data may have to be discarded. Similarly, when the data contain high quality audio, video recordings and images, such as video recordings of interior to the house, images of family members, video recordings of children playing in the swimming pool and so forth, it becomes essential that quality of such data be reduced drastically when allowing the data to be monitored by a neighbor, for example. This is in the interest of security, safety and privacy of the users.

The incoming sensor data signals, audio and video signals and image signals at node T0-3 607 (any or some of the nodes T0, T1, T2 or T3 where these advanced capabilities, such as transcoding, are implemented) are at first decrypted 691 and de-multiplexed 611. Then, audio and image/video signals are decoded 621, 651, de-packetized 623, 653 and decompressed 625, 655, thereby extracting the original quality signals. The audio and image/video signals are then adaptively encoded 627, 657. This is done by employing compression 629, 659 and time stamping and packetizing 631, 661 the audio and image/video signals. While encoding 627, 657, the audio and image/video signals quality is reduced 695, 697 to a level set by the user during configuration setting of the user device (161 of the FIG. 1). Then, the data signals, audio and video signals and image signals are multiplexed 671 and encrypted 693. When it comes to sensor data quality control 681, the number of samples provided is controlled and the accuracy of the data is reduced to a level below 100%. Once these digital signal processing are completed, the sensor data signals, audio and video signals and image signal quality is reduced as per the configuration settings.

Figure 7:
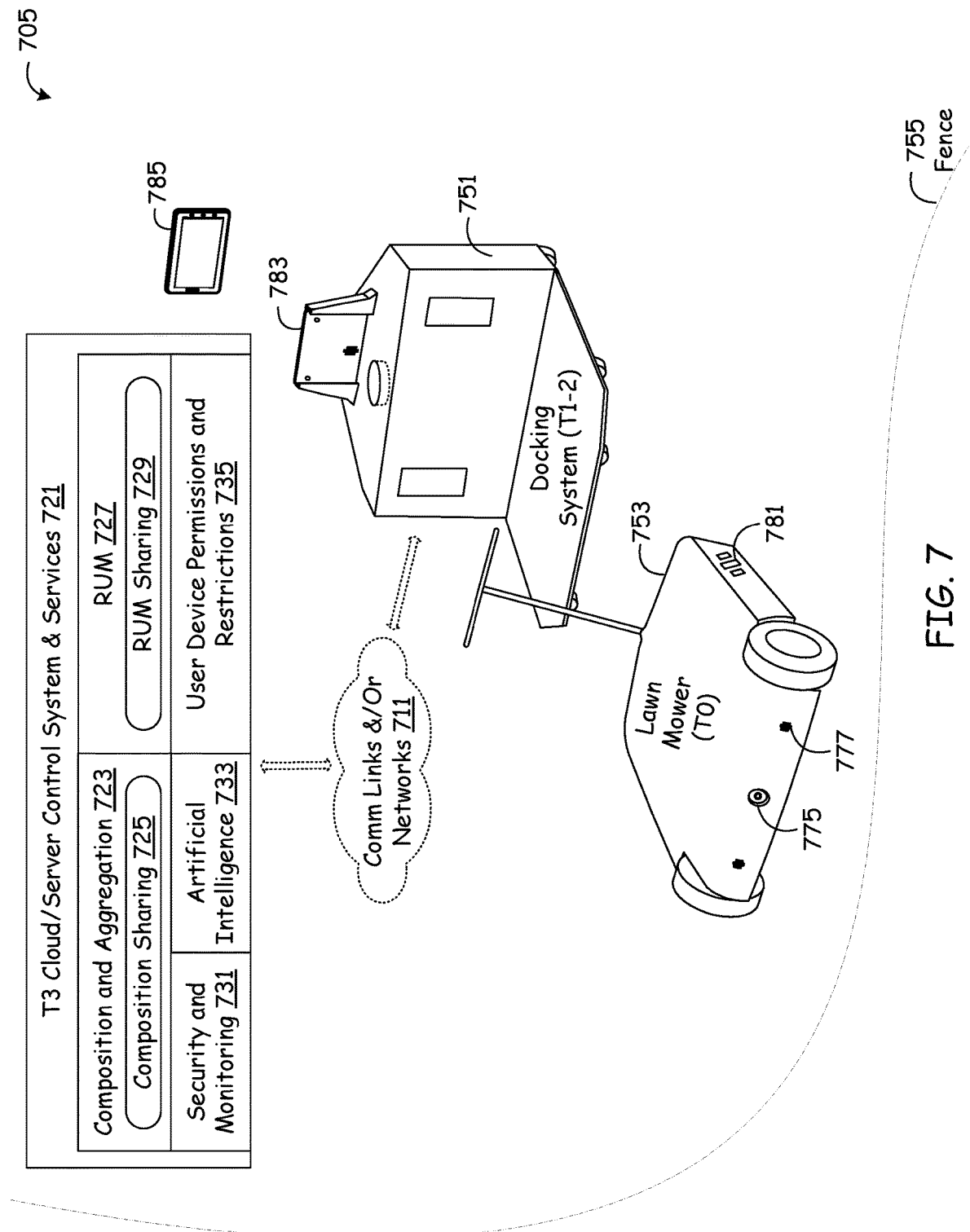
FIG. 7 is a schematic diagram illustrating an exemplary usage of the tier based restricted usage management system of FIG. 1.

FIG. 7 is a schematic diagram illustrating an exemplary usage 705 of the tier based restricted usage management system of FIG. 1. The schematic diagram 705 illustrates a lawnmower 753 employed as a lawn mower in its primary function, whereas many secondary roles are also envisaged. The secondary roles include as a security guard, assisting the owner in monitoring playing children, taking care of the garden needs, personal assistant and so forth.

The lawnmower 753, besides consisting of necessary lawn mowing parts, also contains a head light and video camera 775, microphone 777 and other sensors necessary for attending the garden needs, a speaker 781 to communicate with the owner, family members and other people who happened to be in the neighborhood. The lawnmower 753 is designed as a tier 0 (T0) system.

The lawnmower 753 is a self-docking unit and docks automatically on a docking system 751 to charge battery and to exchange data, upgrade firmware and so forth. The docking system 751 also contains smartphone socket 783 where a dedicated mobile phone or owner's everyday smartphone 785 is placed. To cut costs, no separate display or user interfaces incorporated in the docking system 751. The docking system 751 is designed as a tier 1 (T1) system, whereas the smartphone 785 is designed to work as tier 2 (T2) system. To function as a T2 system, the smartphone 785 has a dedicated app, supplied by the manufacturer, installed in it. The smartphone 785 has necessary user interfaces and display to interact with the owner and set configurations. When on work, the lawnmower 753 communicates with the docking system 751 by utilizing Wi-Fi, Bluetooth or infrared technologies.

A cloud/server control system and services 721 is designed to function as a tier 3 (T3) system. To perform as a T3 node, the cloud/server control system and services 721 consists of composition and aggregation module 723, RUM module 727, security and monitoring module 731, artificial intelligence engine 733 and user device permissions and restrictions 735. To perform sharing functionalities, the composition and aggregation module 723 consists of composition sharing module 725 and the RUM module consists of RUM sharing module 729. Communication links and/or networks 711 make the communication between node T3 721 and the nodes T0 753, T1 751 and T2 785 possible.

Even though the lawnmower 753 is a T0 node, it does have sufficient capability to communicate with nodes T1-2 and T3 and respond to the query of the owner and family members and gently ward off intruders off the boundary (house fence 755). To identify the boundary, the lawn mower uses an infrared distance measuring technology or global positioning system (GPS) technology.

Further, the lawnmower 753, in conjunction with the T1 docking system 751 and T3 cloud system 721, has the capability of face characterizations (using face markers and facial motion capture technology, for example). That is, it identifies faces that are familiar and unfamiliar by comparing the faces with those stored in the memory. It also captures the emotions or mood of the owner and family members. In general, the lawnmower 753, in conjunction with the processes of the nodes T1-2 and T3, characterizes objects, localities and humans in the proximity as familiar object, locality or face, or unfamiliar object, locality or face (strangers). The lawnmower 753 automatically looks up in the social media, such as Facebook®, Google+®, and determines the profiles of the owner and family member as well as strangers and determines what to say, via the speaker 781.

For example, when the lawnmower 753 sees the owner just coming out of the house, it might say, "Good morning Harry, there are three email messages for you," or "Good evening Harry, lawnmower needs new batteries," or "Hi Harry, your daughter wants you to call her, shall I connect to her?" When the owner responds, "From whom do I have messages," it might respond by saying, "From Robert, Angelo and Annie." For additional capabilities of having intelligent conversations with the owner and family members (for example, regarding weather conditions and alerts, allergy related information, latest political, science and sports news, news from family members who are away on vacation and so forth), the lawnmower 753 utilizes artificial intelligence engine 733 in the cloud 721.

Figure 8:
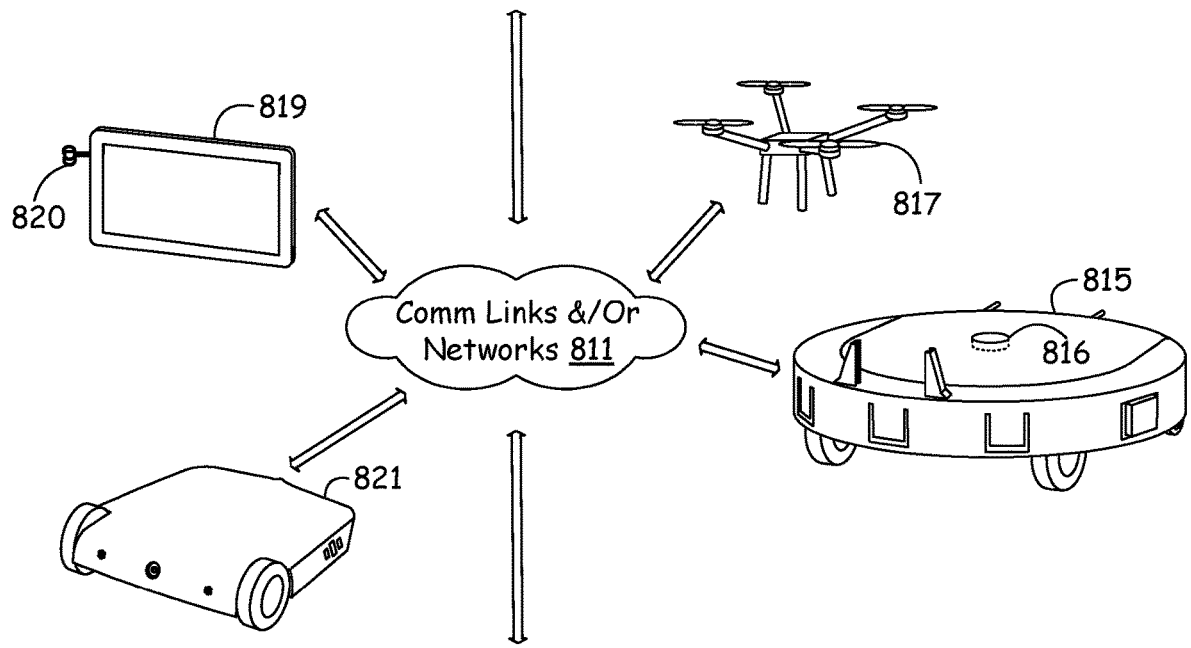
FIG. 8 is a schematic diagram illustrating few more exemplary usages of the tier based restricted usage management system of FIG. 1.

FIG. 8 is a schematic diagram illustrating few more exemplary usages 805 of the tier based restricted usage management system of FIG. 1. In accordance with the present invention, many user devices are envisaged to perform variety of functions in the tier 0 (T0) level, however user devices themselves do function anywhere in the tier 0 to 2 (T0-2) levels in general. The ones illustrated in FIG. 8 as examples are vacuum cleaners 815, drones 817, smartphones 819 and lawnmowers 821 (whose example has been discussed with reference to the FIG. 7).

Even though the smartphones 819 are generally illustrated as T1 or T2 level devices, the ones presented in here have many sensors built into them, they are capable of performing as T0-2 level devices. The smartphone 819 has an app installed in it, supplied by a renderer, that manages the functionalities of T0-2 levels. The example shown here though has a small camera unit 820, with 360° vision, plugged into the audio socket, that functions as a T0 level module. The smartphone 819 itself has a T2 level app 851 installed in it to receive and process the visual contents of the room. The camera unit 820, in conjunction with the T2 level app 851 and an artificial intelligence engine 833 of T3 cloud 821, is capable of identifying the face of the owner and communicate with him or her regarding appointments and many other information.

For example, the camera unit 820 can wake up in the morning, check for emails, read the contents of emails in the morning, social media updates, automatically connect smartphone to a doctor's office with whom appointment was fixed and so forth. The camera unit 820, along with the app 851, can also identify the objects within the room, and determine where the owner is, and the smartphone 819 can then decide what to say to the owner. Many other applications for the smartphone 819 with the camera unit 820 have been contemplated.

The vacuum cleaner 815, besides vacuuming the home carpets when no one is present, can perform many other functions. For this purpose, a pluggable and detachable electronic circuitry module 816 exists. The electronic circuitry module 816 has T2 apps 851 installed in it. It can communicate with the cloud T3 821 via a communication links and/or networks 811. The other functions of the vacuum cleaner 815 includes safe guarding the house, checking up for the needs of indoor plants, carpets and even pets, and functioning as a personal assistant of the owner. Similarly, the drones 817 are envisaged to have many functions such as house or building guards, aerial image/video capturing and so forth. They have permissions to fly within a certain region (boundary) as set in the T2 apps 851 or T3 cloud 821.

In accordance with the current invention, when security and/or privacy is of concern or higher level nodes do not have adequate capability to handle higher quality images or video, if a higher level node requests for an image or video, the lower level nodes send image or video of lesser quality or manipulated images or video. For example, the lower level nodes may deliver images with blank face or fuzzy face. If the T0 element is a baby monitor, it might send just enough information (such as fuzzy face of the baby, while all other information being intact in the image or video) to know that baby is still there. Similarly, there are rules, regulations and restrictions, as defined in 859, 835, as to how the higher level nodes can consume the data and the lower level nodes can capture the data.

To perform the aforementioned functions, the T2 apps 851 consists of composition and aggregation module 853, restricted access management (RUM) module 855, security and monitoring module 857, drone (mobile unit) boundaries and regulations 859, object identification 861 and data sharing 863. In addition, the T3 cloud/server control system and services 821 consists of composition and aggregation module 823, RUM module 827, security and monitoring module 831, artificial intelligence engine 833 and drone (user device) permissions and restrictions 835. To perform sharing functionalities, the composition and aggregation module 823 consists of composition sharing module 825 and the RUM module consists of RUM sharing module 829. The communication links and/or networks 811 make the communication between the cloud node T3 821 and the nodes T0-1 815, 817, 819, 821 and T2 851 possible.

Figure 9:
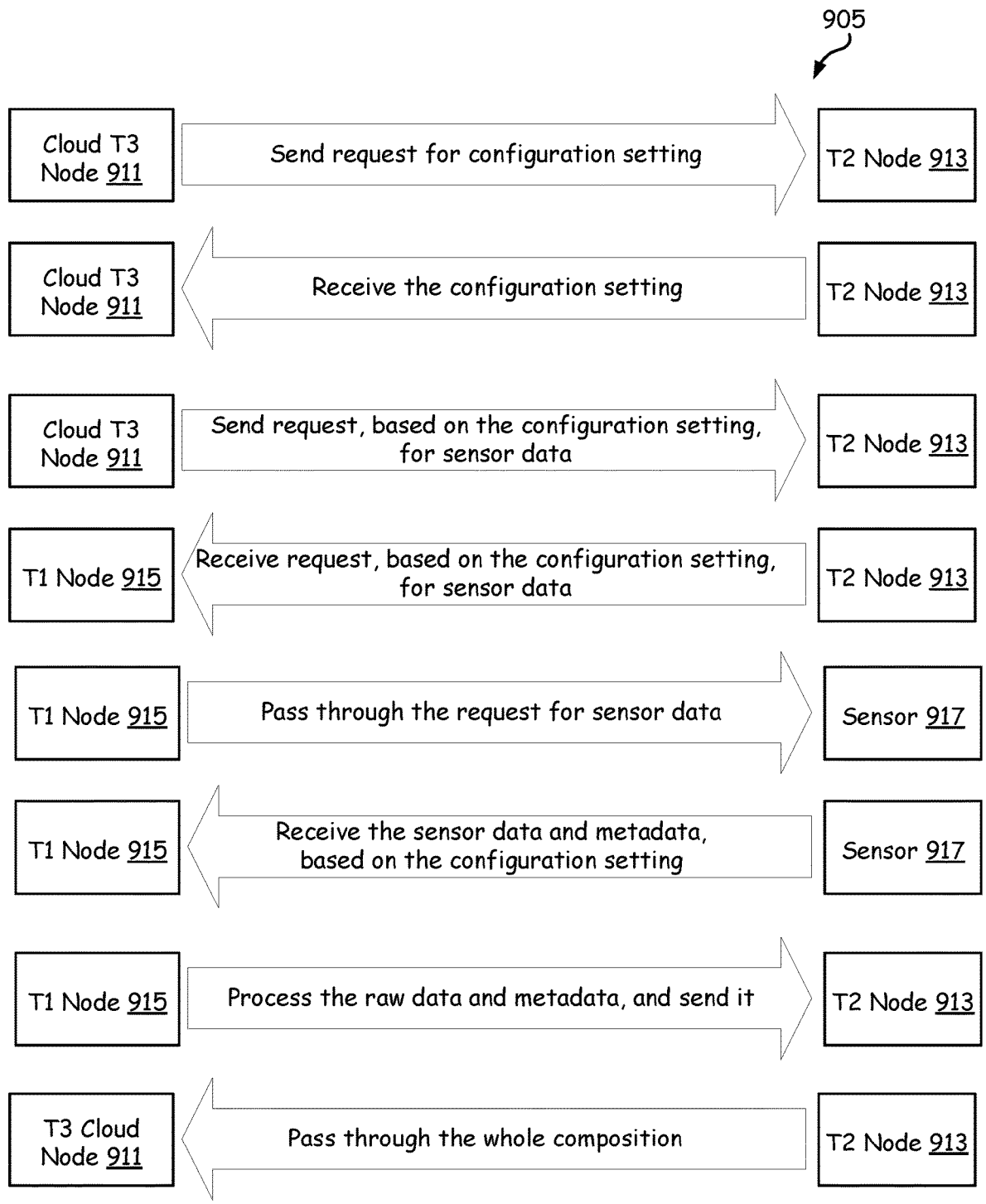
FIG. 9 is a schematic diagram illustrating exemplary dataflow involved in of the tier based restricted usage management system of FIG. 1.

FIG. 9 is a schematic diagram illustrating exemplary dataflow 905 involved in of the tier based restricted usage management system of FIG. 1. The diagram, in specific, illustrates typical ways in which a sensor, based on request from higher level nodes, reacts with raw data, metadata (and ways in which higher level nodes develop whole composition when flowing from one tier to another). The T0-2 node sensor circuitries, in general, are programmed to sense the environment based on certain configuration. In other words, the diagram illustrates processes involved in a consumption based flow from the sensor to higher level nodes. In addition, the diagram also illustrates the manner in which T0 nodes collect data based on the consumer (nodes T1, T2 or T3) and generates data in that particular manner. The sensor works based on certain configuration, depending on the consumer node and equipment.

The processes of a cloud T3 node 911 requesting and collecting data from a sensor begins with it requesting for configuration setting from lower level nodes. In the illustration, the configuration is assumed to be set in node T2 913. Then, the cloud T3 node 911 receives configuration setting.

After that, the cloud T3 node 911 sends request for a sensor data, based on the configuration, to the node T2 913. Then, the T1 node 915 receives the request for the sensor data from the node T2 913. The T1 node 915 simply passes through the request for the sensor data to the sensor (T0 node 917). The sensor 917 generates the sensor data and metadata. The metadata includes time stamping, permissions and rights related data and so forth.

The T1 node 915, based on configuration setting, then processes the raw data and metadata and sends it to the T2 node 913. The processes include one or more of compressing the data, encrypting the data, transcoding the data, aggregating the raw data and metadata and generating compositions. Then, the T2 node 913 simply passes through the whole composition to the cloud T3 node 911.

As one of ordinary skill in the art will appreciate, the terms "operably coupled" and "communicatively coupled," as may be used herein, include direct coupling and indirect coupling via another component, element, circuit, or module where, for indirect coupling, the intervening component, element, circuit, or module does not modify the information of a signal but may adjust its current level, voltage level, and/or power level. As one of ordinary skill in the art will also appreciate, inferred coupling (i.e., where one element is coupled to another element by inference) includes direct and indirect coupling between two elements in the same manner as "operably coupled" and "communicatively coupled."

It should be clear that the term "mobile unit" used herein includes cars, vehicles, driver-assisted mobility vehicles, driver-less vehicles, etc. It also includes a self-drive vehicle or a driver assisted vehicle. The user device 161, lawnmower 753, mobile unit 815 across the figures could be configured features and capabilities described herein. All of the concepts herein could be included in mobile units configured to be passenger or passenger-less vehicles, self-driver cars, driver assisted cars, farm equipment, and industrial equipment.

Although the present invention has been described in terms of GPS coordinates/and navigational information communication involving mobile phones and computers, it must be clear that the present invention also applies to other types of devices including mobile devices, laptops with a browser, a hand held device such as a PDA, a television, a set-top-box, a media center at home, robots, robotic devices, vehicles capable of navigation, and a computer communicatively coupled to the network.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention.

One of average skill in the art will also recognize that the functional building blocks, and other illustrative blocks, modules and components herein, can be implemented as illustrated or by discrete components, application specific integrated circuits, processors executing appropriate software and the like or any combination thereof.

Moreover, although described in detail for purposes of clarity and understanding by way of the aforementioned embodiments, the present invention is not limited to such embodiments. It will be obvious to one of average skill in the art that various changes and modifications may be practiced within the spirit and scope of the invention, as limited only by the scope of the appended claims.

What is claimed is:

1. A modular household robotic infrastructure comprising:
    a mobile robotic device operable to provide a primary household service, the mobile robotic device having an outer housing surface, a first dock and a second dock, the first dock being configured to receive a user telephony device that supports a secondary household service;
    a sensor module operable, under direction of first control signals, to generate encrypted data relating to the secondary household service, the sensor module operable in having a mating engagement with the second dock on the outer housing surface of the mobile robotic device; and
    a communication infrastructure that supports secure exchanges of the encrypted data between the user telephony device and the sensor module via the mobile robotic device, the mobile robotic device participating in the secure exchanges yet being unable to decrypt the encrypted data.

2. The modular household robotic infrastructure of claim 1, further comprising a first system that generates encrypted control signals, the first control signals, and the mobile robotic device being unable to decrypt the encrypted control signals.

3. The modular household robotic infrastructure of claim 1, wherein the communication infrastructure supports short range wireless communication with the sensor module.

4. A modular household robotic infrastructure comprising:
    a mobile robotic device operable to perform a primary household service, the mobile robotic device having a first dock and a second dock, the first dock being configured to receive a user telephony device that supports a secondary household service, the mobile robotic device being capable of performing the primary household service without assistance from the user telephony device;
    a removable module operable in mating engagement with the second dock to generate encrypted data relating to the secondary household service; and
    a communication infrastructure that supports secure exchanges of the encrypted data from the removable module.

5. The modular household robotic infrastructure of claim 4, wherein the user telephony device interacts with a remote server to support the secondary household service.

6. The modular household robotic infrastructure of claim 4, wherein the user telephony device interacts with a remote server to support the primary household service.

7. The modular household robotic infrastructure of claim 4, wherein the user telephony device is configured to assist in carrying out the primary household service.

8. The modular household robotic infrastructure of claim 4, wherein the user telephony device is configured to assist in scheduling the primary household service and the secondary household service.

9. The modular household robotic infrastructure of claim 4, wherein the primary household service comprises a vacuuming service.

10. The modular household robotic infrastructure of claim 4, wherein the primary household service comprises a lawn related service.

11. The modular household robotic infrastructure of claim 4, wherein the removable module comprises a sensor.

12. The modular household robotic infrastructure of claim 4, wherein the removable module is configured to receive data relating to the first household service from the mobile robotic device.

13. A modular household robotic infrastructure comprising:
    a mobile robotic device operable to perform a primary household service, the mobile robotic device having a first dock;
    a removable module operable in mating engagement with the first dock to generate encrypted data relating to a secondary household service;
    a communication infrastructure that supports exchanges between the removable module and a user telephony device to support the secondary household service;
    the mobile robotic device being capable of performing the primary household service without assistance from the user telephony device; and
    the mobile robotic device being configured to carry out mobility related commands to assist in the secondary household service.

14. The modular household robotic infrastructure of claim 13, wherein the mobility related commands originate from the user telephony device.

15. The modular household robotic infrastructure of claim 13, further comprising a second dock that supports a mating engagement with the user telephony device.

16. The modular household robotic infrastructure of claim 13, further comprising a remote server, and the user telephony device interacts with the remote server to support the secondary household service.

17. The modular household robotic infrastructure of claim 13, further comprising a remote server, and the user telephony device interacts with the remote server to support the primary household service.

18. The modular household robotic infrastructure of claim 13, wherein the user telephony device is configured to assist resolving times of operation of the secondary household service by considering times of operation of the primary household service.

19. The modular household robotic infrastructure of claim 13, wherein the primary household service comprises a vacuuming service.

20. The modular household robotic infrastructure of claim 13, wherein the primary household service comprises a lawn related service.

* * * * *